(12) United States Patent
Jin

(10) Patent No.: US 10,058,072 B2
(45) Date of Patent: Aug. 28, 2018

(54) PET FEEDING AND TRAINING APPARATUS

(71) Applicant: Ningbo Sincere Holding Group Co., Ltd., Ningbo (CN)

(72) Inventor: Jianming Jin, Ningbo (CN)

(73) Assignee: Ningbo Sincere Holding Co., Ltd., Ningbo (CN)

( * ) Notice: Subject to any disclaimer, the term of this patent is extended or adjusted under 35 U.S.C. 154(b) by 228 days.

(21) Appl. No.: 15/030,259

(22) PCT Filed: Oct. 17, 2014

(86) PCT No.: PCT/CN2014/000917
§ 371 (c)(1),
(2) Date: Apr. 18, 2016

(87) PCT Pub. No.: WO2015/062165
PCT Pub. Date: May 7, 2015

(65) Prior Publication Data
US 2016/0270369 A1  Sep. 22, 2016

(30) Foreign Application Priority Data
Oct. 30, 2013  (CN) .................... 2013 2 0682750 U

(51) Int. Cl.
*A01K 5/02* (2006.01)
*A01K 5/01* (2006.01)
*A01K 15/02* (2006.01)

(52) U.S. Cl.
CPC .......... *A01K 5/0233* (2013.01); *A01K 5/0114* (2013.01); *A01K 15/02* (2013.01)

(58) Field of Classification Search
CPC .. A01K 5/0114; A01K 5/0135; A01K 5/0142; A01K 5/0275; A01K 5/0291; A01K 5/0225; A01K 5/025; A01K 5/0208; A01K 5/0233; A01K 5/0258; A01K 7/02
USPC ............................ 119/51.01, 52.1, 54, 61.55
See application file for complete search history.

(56) References Cited

U.S. PATENT DOCUMENTS

| 4,267,799 A * | 5/1981 | Bacon .................. A01K 5/0275 |
| | | 119/61.2 |
| 2005/0252457 A1* | 11/2005 | Morosin .............. A01K 5/0291 |
| | | 119/51.13 |

* cited by examiner

*Primary Examiner* — Peter M Poon
*Assistant Examiner* — Jeffrey R Larsen
(74) *Attorney, Agent, or Firm* — Wang Law Firm, Inc.

(57) ABSTRACT

A pet feeding training device includes a housing, a food delivery mechanism and a food delivery control mechanism. The food delivery control mechanism comprises a token dropping opening, a swinging plate which is able to return to an initial position disposed under the token dropping opening, a food blocking plate provided in the food channel for blocking the food from moving from the food storage compartment to the food outlet, and a driving mechanism, which can lower the food blocking plate and unblock the food channel in response to swinging of the swinging plate. The food in the food channel can be unblocked and delivered from the food outlet only after tokens are thrown into the token dropping opening. A pet intuitively retrieves food on its own initiative after repeated training.

7 Claims, 7 Drawing Sheets

PET FEEDING AND TRAINING APPARATUS

RELATED APPLICATIONS

This application is a national phase entrance of and claims benefit to PCT Application for eating training device for pets, PCT/CN2014/000917, filed on Oct. 17, 2014, which claims benefit to Chinese Patent Application 201320682750.2, filed on Oct. 30, 2013. The specifications of both applications are incorporated here by this reference.

FIELD OF THE INVENTION

The present invention relates to a feeding device for pets, in particular to a pet feeding training device.

DESCRIPTION OF THE PRIOR ART

Both in Europe and the United State and in China, feeding pet cats has become more and more popular. However, with the development of the society, people start to live in groups in crowded cities, and the living space for people is thus further compressed. Correspondingly, pets gradually lose the activity space. Hence, there are commercially available toys for pets, which are designed in accordance with the preference of pets and can attract pets. With the deep research and development area of toys for pets, the existing simple toys for pets can not satisfy people's needs any more. Therefore, people start to research and develop a series of educational toys which allow pets to play with those toys and meanwhile improve the intelligence of the pets. Such educational toys, which integrate playing, feeding and training, require a pet to get food by using its hands and brain.

For example, China Patent CN202697452U (Patent No. 201220367272.1), titled "EDUCATIONAL TOYS FOR PETS", disclosed an educational toy, including a housing having an accommodating chamber, with a feeding port and a blade rotating tank being respectively provided on the housing independently; and further including a rotating blade, where the blade includes a rotating shaft and blades uniformly fixed onto the rotating shaft, the rotating shaft is fixed onto an upper housing body so that pets can get food through their own efforts. Consequently, the intelligence of pets is improved during having fun, and the technical effect of training the intelligence is realized. However, this educational toy for pets can not generate any sound and thus it is different for pets to keep the persistent interest in playing with this toy; and furthermore, this educational toy has some defects in terms of rewarding and training the intelligence. As a result, further improvements are urgently needed.

SUMMARY OF THE INVENTION

Based on the above stated prior art, a technical problem to be solved by the present invention is to provide a pet feeding training device, which feeds pets only after they throw a token into a set position, thereby increasing the fun of eating for pets and training the eating of the pets.

To solve the technical problem, the pet feeding training device comprises a housing, a food delivery mechanism disposed inside the housing, and a food delivery control mechanism also disposed inside the housing, wherein, the food delivery mechanism further comprises the a food storage compartment for storing food, a food outlet, and a food channel connecting the food storage compartment to the food outlet, the food delivery control mechanism further comprises a token dropping opening, a swinging plate, which is able to return to an initial position, disposed under the token dropping opening, a food blocking plate provided in the food channel for blocking the food from moving from the food storage compartment to the food outlet, and a driving mechanism with a first end connected to the swinging plate and a second end connected to the food blocking plate, the driving mechanism lowering the food blocking plate and unblocking the food channel in response to swinging of the swinging plate.

Preferably, the driving mechanism further comprises a connecting rod having a first end and a second end and connected to the swinging plate, a supporting frame and a spring; the first end of the connecting rod is connected to the food blocking plate, the first end and the second end of the connecting rod are supported by the supporting frame; the spring enables the swinging plate and the food blocking plate to return to their respective positions; the connecting rod engages the food blocking plate to move down and to unblock the food channel when the swinging plate swings downwardly.

Preferably, the food blocking plate is provided with a jack for receiving the first end of the connecting rod. Additionally, the connecting rod can be connected to the food blocking plate by adhering and fixing, and or by clamping.

Preferably, the swinging plate is provided with a groove for positioning the connecting rod. In this way, the swinging plate is in linkage connection to the connecting rod, so that the connecting rod engages the food blocking plate to move down and to unblock the food channel when the swinging plate swings downwardly.

Preferably, for ease of machining, the groove of the swinging plate has a dentate internal surface.

To realize the linkage connection between the swinging plate, the connecting rod and the food blocking plate, preferably the groove is provided with protrusion extending away from the groove, closer to the food blocking plate, and the food blocking plate is provided with a inserting slot for receiving the protrusion of the groove. Of course, the connecting rod may be directly clamped into the locating neck, by setting the connected ends of the connecting rod and the food blocking plate to be square and omitting the protrusion, thus to realize the linkage connection between the connecting rod and the food blocking plate.

Preferably, the spring is a torsional spring with a first end and a second end, the spring sleeves onto the second end of the connecting rod; the first end of the torsional spring is attached to the housing, and the second end thereof is attached to the connecting rod. The second end of the torsional spring is attached to the connecting rod, so that the torsional spring can reset the swing plate after pressed by its own restoring force. In addition to the aforementioned implementations, the second end of the torsional spring can be further pressed against the back of the swing plate, and the same function can be achieved in this way.

Preferably, the supporting frame further comprises two upright columns and two connecting block respectively sleeved on each column, each connecting block has a recess for receiving the connecting rod.

Preferably, to enhance the rewarding effect, a sound device is provided under the swing plate inside the housing; the sound device comprises a speaker for playing preset sounds and a trigger switch controlling the speaker, the trigger switch triggers the speaker when the swinging plate swings downwardly. The speaker can play back voice of the master of a pet, for example, a cry for motivating the pet, to form an excellent rewarding mechanism. After trained, a pet can not only learn how to obtain food, but also receive spiritual reward. This facilitates a pet to act reflexively and thus learn to get food initiatively.

In addition to the aforementioned method of triggering the trigger switch by the swing plate, a blocking plate capable of triggering the trigger switch is provided on the connecting rod and the blocking plate rests against the spring. The trigger switch is triggered by adding a blocking plate capable of triggering the trigger switch on the connecting rod.

Compared with the prior art, in the present invention, the food in the food channel can be unblocked and delivered from the food outlet only after tokens are thrown into the token dropping opening, therefore, the master of a pet can assign a suitable token and train the pet to throw the token into the token dropping opening. After trained for many times to act reflexively, the pet can get food initiatively. This increases the fun of feeding and saves the daily task for the master to feed the pet. Consequently, the work of feeding pets becomes easier and more interesting.

DETAILED DESCRIPTION OF THE PREFERRED EMBODIMENT

Figure 1:
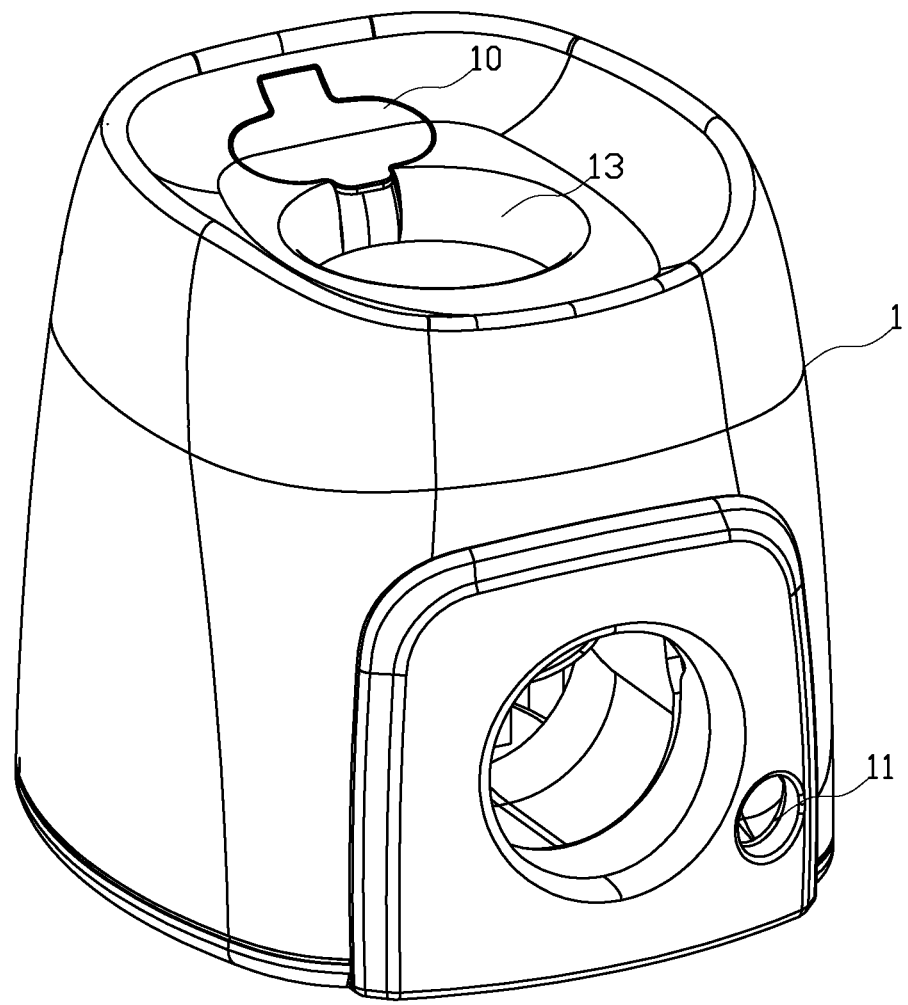
FIG. 1 is a perspective view of a pet feeding training device according to an embodiment of the present invention.
Figure 2:
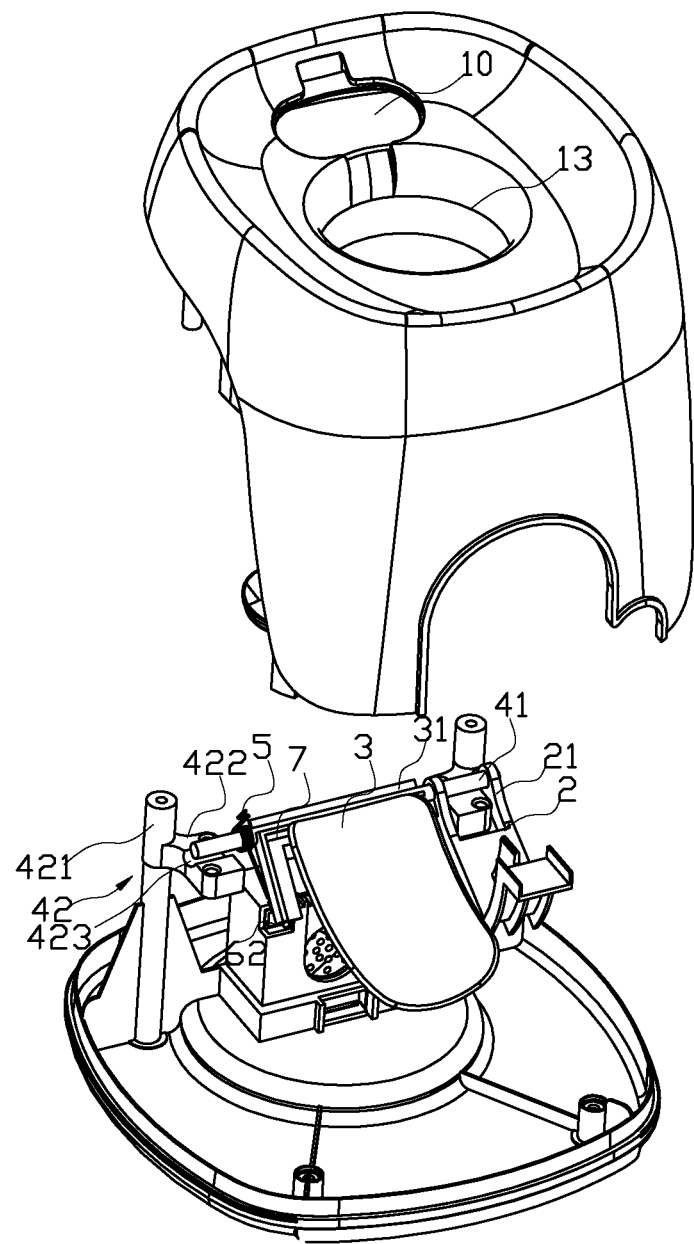
FIG. 2 is a perspective view of the pet feeding training device according to the embodiment of the present invention, of which the housing separated from the food delivery control mechanism.
Figure 3:
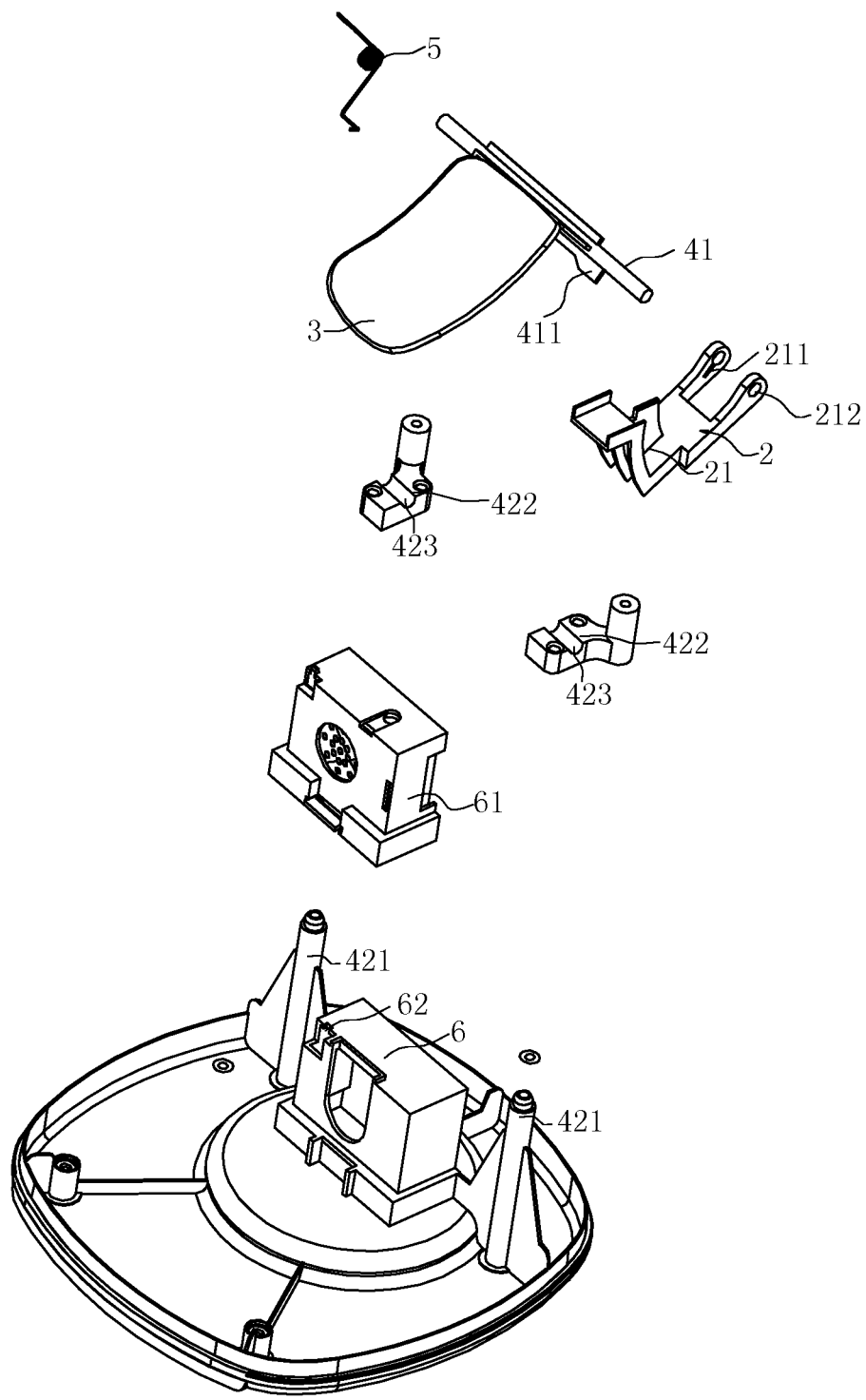
FIG. 3 is an exploded view of the food delivery control mechanism according to the embodiment of the present invention.
Figure 4:
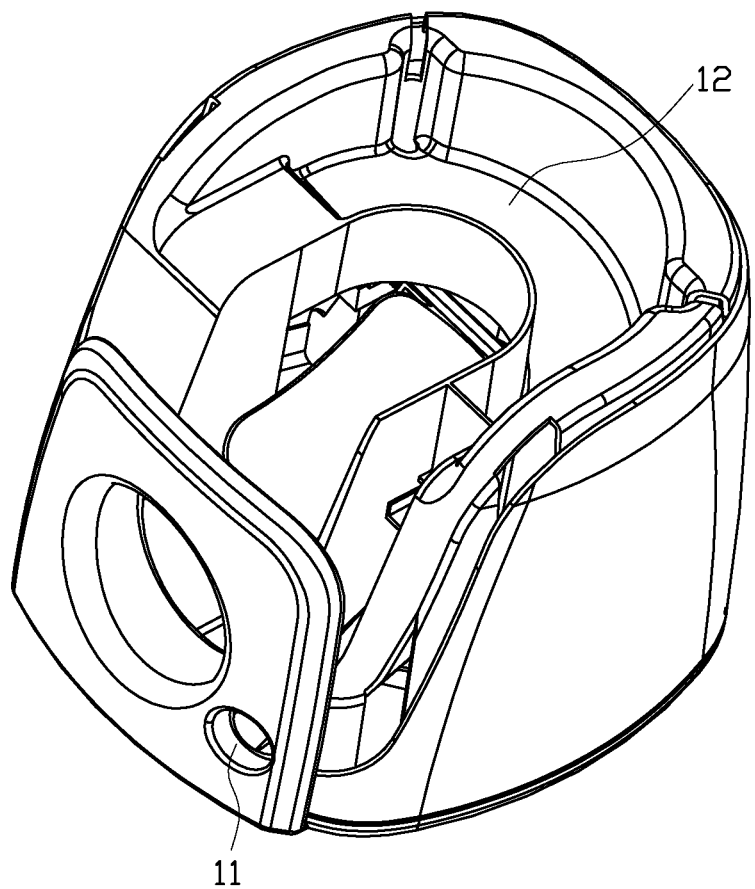
FIG. 4 is a perspective view of the food storage compartment according to the embodiment of the present invention.
Figure 5:
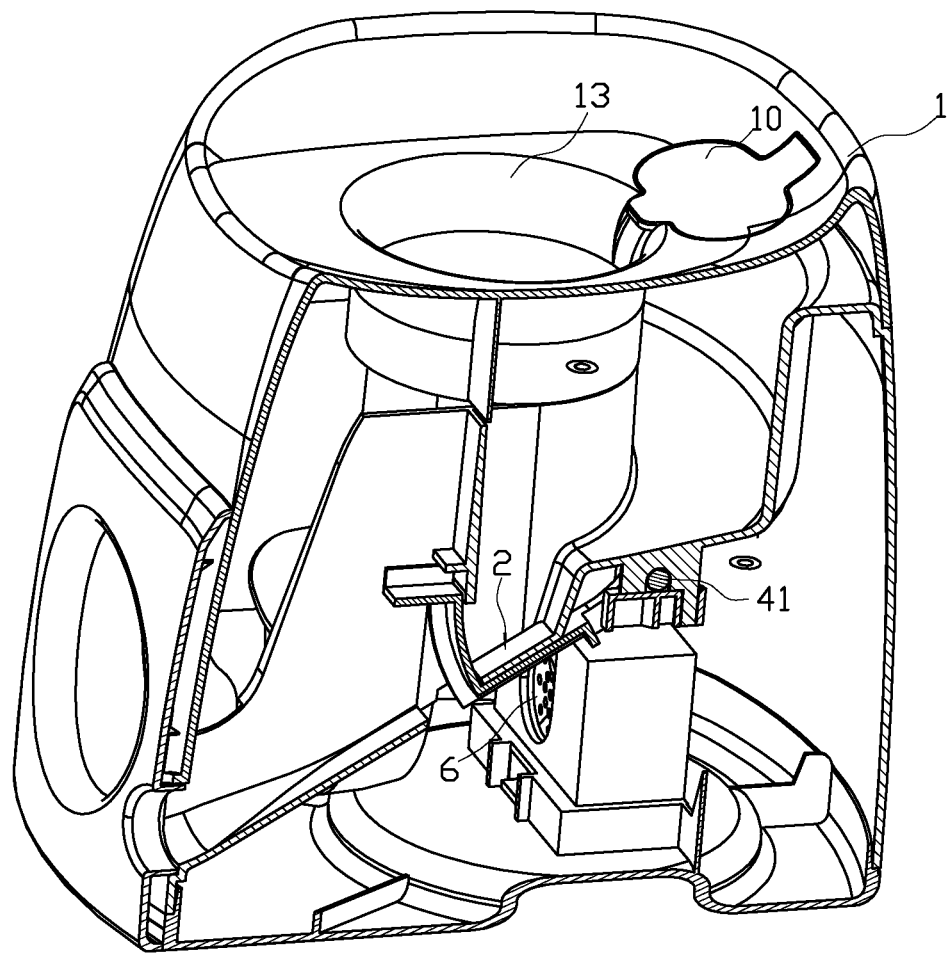
FIG. 5 is a perspective sectional view of FIG. 1.
Figure 6:
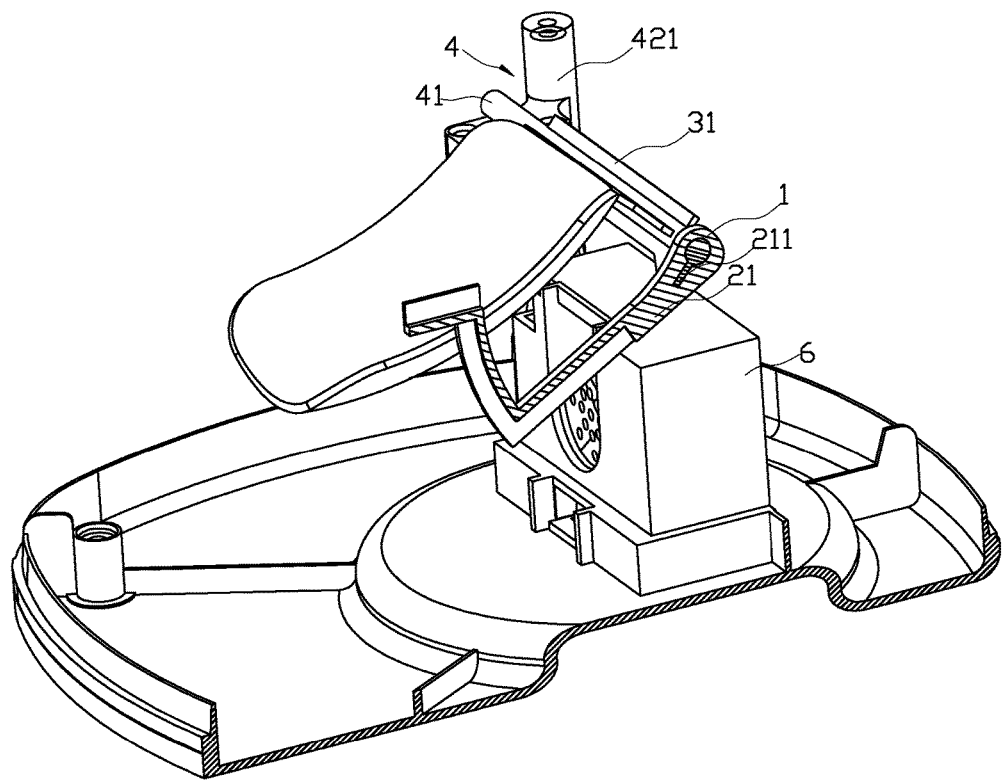
FIG. 6 is a perspective sectional view of the food delivery control mechanism according to the embodiment of the present invention.
Figure 7:
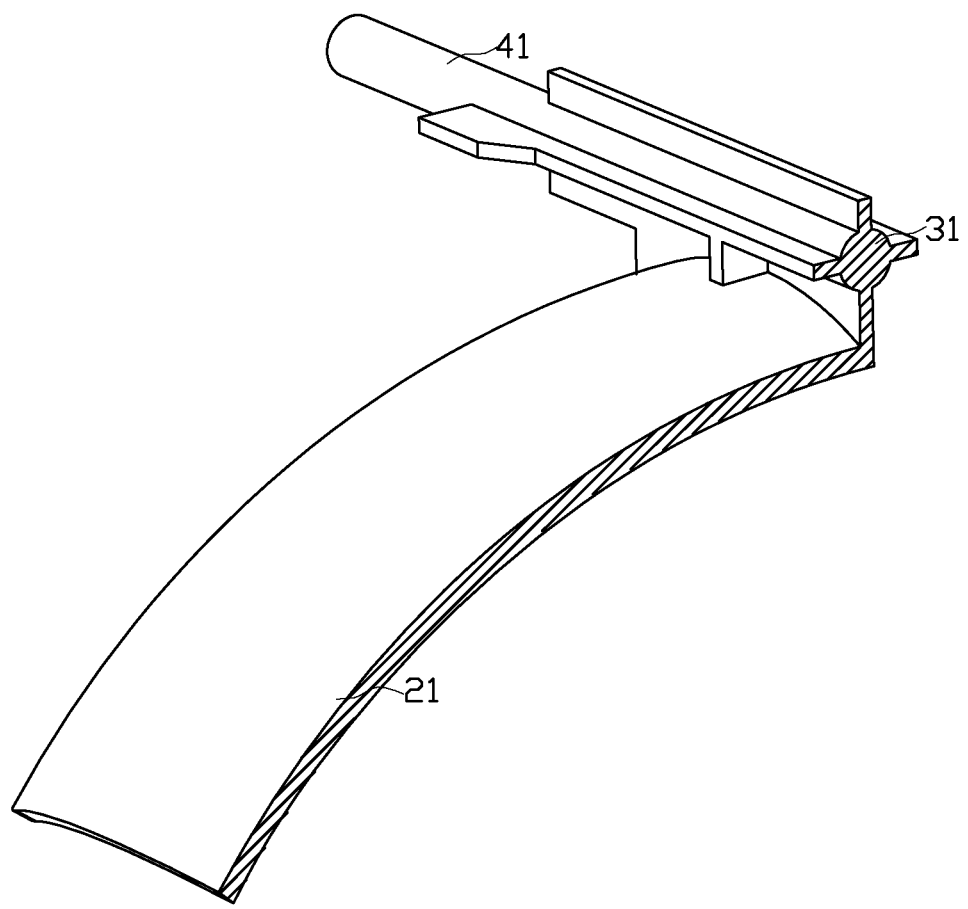
FIG. 7 is a perspective sectional view of the connecting rod and the swinging plate according to the embodiment of the present invention.

To enable a further understanding of the present invention content of the invention herein, refer to the detailed description of the invention and the accompanying drawings below:

FIG. 1-FIG. 7 show a preferred embodiment of the present invention. The pet feeding training device comprises a housing 1, a food delivery mechanism and a food delivery control mechanism both disposed inside the housing 1.

The food delivery mechanism comprises a food storage compartment 12 for storing food, a food outlet 11, and a food channel 2 connecting the food storage compartment 12 to the food outlet 11.

The food delivery control mechanism comprises a token dropping opening 13, a swinging plate 3 which is able to return to an initial position, disposed under the token dropping opening 13, a food blocking plate 21 provided in the food channel 2 for blocking the food from moving from the food storage compartment to the food outlet, and a driving mechanism 4 with a first end and a second end.

The first end of the driving mechanism 4 is connected to the swinging plate 3 and the second end of the driving mechanism 4 is connected to the food blocking plate 21, and the driving mechanism 4 can lower the food blocking plate 21 and unblock the food channel in response to swinging of the swinging plate 3.

The driving mechanism 4 further comprises a connecting rod 41 with a first end and a second end, a supporting frame 42 supporting the connecting rod 41, and a torsional spring 5, the supporting frame 42 further comprises two upright columns 421 and two connecting block 422 respectively sleeved on each column 421, each connecting block 422 has a recess 423 for receiving the connecting rod 41.

The swinging plate 3 is provided with a groove 31 for positioning the connecting rod 41, the middle of the connecting rod 41 is located inside the groove 31, that is, the connecting rod 41 is positioned inside the groove 31 with a dentate internal surface; and the first end of the connecting rod 41 is connected to the food blocking plate 21, that is, the food blocking plate 21 is provided with a jack 212 for receiving the first end of the connecting rod 41.

In order to realize the linkage connection between the connecting rod 41 and the food blocking plate 21, the connecting rod 41 is provided with protrusion 411 extending away from the connecting rod, and the food blocking plate 21 is provided with a inserting slot 211 for receiving the protrusion 411 of the connecting rod 41.

The torsional spring 5 is sleeved onto the second end of the connecting rod 41, and the first end of the torsional spring 5 is attached to the housing 1 and the second end thereof is attached to the connecting rod 41; and the torsional spring 5 enables the swinging plate 3 and the food blocking plate 21 to tend to keep away from the supporting frame 42, so that the swinging plate 3, when pressed down, lowers the food blocking plate 21 through the connecting rod 41 to unblock the food.

In order to enhance the rewarding effect, a sounding device 6 is provided under the swing plate 3 inside the housing 1; the sounding device 6 comprises a speaker 61 for playing preset sounds and a trigger switch 62 controlling the speaker, the trigger switch 62 triggers the speaker when the swinging plate 3 swings downwardly or the trigger switch can be triggered by adding a blocking plate 7 capable of triggering the trigger switch provided on the connecting rod, and one end of the torsional spring 5 is pressed against the blocking plate 7.

When in use, a feeding lid 10 on the housing 1 is opened, and then an appropriate amount of pet food is added to the food storage compartment 12 according to the shelf life of the pet food; the master of a pet may assign an appropriate token to be thrown, for example, ball toys such as a tennis ball, to train the pet to throw the tennis ball into the token dropping opening 13, so that the swinging plate 3 can be pressed down and unblocks the food by lowering the food blocking plate 21 and then the pet food falls out from the food outlet 11 to provide an appropriation amount of food; and at the same time, the trigger switch 62 of the sound device 6 can be triggered and thus the voice of the master is played back, thereby increasing the fun of eating for pets; and if the pet does not throw the tennis ball into the token dropping opening 13, blocking food by the food blocking plate 21 will not be released, and thus the food will not fall out from the food outlet 11. After trained for many times to act reflexively, the pet can get food initiatively. This increases the fun of feeding and saves the daily task for the master to feed the pet. Consequently, feeding pets becomes easier and more interesting. When the master is not home, the pet can feed itself. This is both time and labor saving.

The invention claimed is:

1. A pet feeding training device, comprising:
   a housing;
   a food delivery mechanism disposed inside the housing; and
   a food delivery control mechanism also disposed inside the housing,
   wherein,
   the food delivery mechanism further comprises
      a food storage compartment for storing food,
      a food outlet, and
      a food channel connecting the food storage compartment to the food outlet,
   the food delivery control mechanism further comprises
      a token dropping opening,
      a swinging plate, which is able to return to an initial position, disposed under the token dropping opening,
      a food blocking plate, which is able to return to an initial position, provided in the food channel for blocking the food from moving from the food storage compartment to the food outlet, and
      a driving mechanism with a first end connected to the swinging plate and a second end connected to the food blocking plate, the driving mechanism lowering the food blocking plate and unblocking the food channel in response to swinging of the swinging plate,
   wherein the driving mechanism further comprises a supporting frame, a spring, and a connecting rod having a first end and a second end, the connecting rod being connected to the swinging plate;
   the first end of the connecting rod is connected to the food blocking plate, the first end and the second of the connecting rod are supported by the supporting frame;
   the spring enables the swinging plate and the food blocking plate to return to their respective initial positions;
   the connecting rod moves the food blocking plate down to unblock the food channel when the swinging plate swings downwardly, the connecting rod is provided with a protrusion extending away from the connecting rod, and the food blocking plate is provided with an inserting slot for receiving the protrusion of the connecting rod.

2. The pet feeding training device of claim 1, wherein the food blocking plate is provided with a jack for receiving the first end of the connecting rod.

3. The pet feeding training device of claim 1, wherein the swinging plate is provided with a groove for positioning the connecting rod.

4. The pet feeding training device of claim 1, wherein the spring is a torsional spring with a first end and a second end, the spring sleeves onto the second end of the connecting rod; the first end of the torsional spring is attached to the housing, and the second end of the torsional spring is attached to the connecting rod.

5. The pet feeding training device of claim 1, wherein the supporting frame further comprises two upright columns and two connecting blocks respectively sleeved on each column, each connecting block has a recess for receiving the connecting rod.

6. The pet feeding training device of claim 1, wherein a sound device is provided under the swinging plate inside the housing;
   the sound device comprises a speaker for playing preset sounds and a trigger switch controlling the speaker, the trigger switch triggers the speaker when the swinging plate swings downwardly.

7. The pet feeding training device of claim 6, wherein a blocking plate capable of triggering the trigger switch is provided on the connecting rod, and the blocking plate rests against the spring.

* * * * *